(12) United States Patent
Kjellgren et al.

(10) Patent No.: US 7,794,011 B2
(45) Date of Patent: Sep. 14, 2010

(54) AERODYNAMIC PROPERTIES OF GROUND VEHICLES

(75) Inventors: Per Kjellgren, Asker (NO); Sam Fredriksson, Västra Frölunda (SE)

(73) Assignee: WM-data Caran AB, Gothenburg (SE)

( * ) Notice: Subject to any disclaimer, the term of this patent is extended or adjusted under 35 U.S.C. 154(b) by 364 days.

(21) Appl. No.: 11/813,188

(22) PCT Filed: Jan. 9, 2006

(86) PCT No.: PCT/SE2006/000031
§ 371 (c)(1),
(2), (4) Date: Oct. 15, 2007

(87) PCT Pub. No.: WO2006/080873
PCT Pub. Date: Aug. 3, 2006

(65) Prior Publication Data
US 2009/0146452 A1    Jun. 11, 2009

(30) Foreign Application Priority Data
Jan. 27, 2005    (SE) .................................. 0500206

(51) Int. Cl.
*B62D 35/00* (2006.01)
(52) U.S. Cl. ................. 296/180.1; 244/204.1; 244/206; 296/180.4
(58) Field of Classification Search .................. 105/1.1, 105/1.2, 1.3; 180/903; 244/99.12, 130, 199.1, 244/204.1, 206, 207, 212; 296/180.1, 180.2, 296/180.4
See application file for complete search history.

(56) References Cited

U.S. PATENT DOCUMENTS

| 925,141 | A | * | 6/1909 | Smith | .......................... | 280/159 |
| 926,971 | A | * | 7/1909 | Ahrens | ....................... | 105/1.1 |
| 1,580,577 | A | * | 4/1926 | Baumann | ..................... | 244/207 |

(Continued)

FOREIGN PATENT DOCUMENTS

EP    1 506 911 A1    2/2005

(Continued)

OTHER PUBLICATIONS

Office Action dated Mar. 19, 2009 of corresponding European Application No. 06 700 063.8-2421.

(Continued)

*Primary Examiner*—Glenn Dayoan
*Assistant Examiner*—Paul A Chenevert
(74) *Attorney, Agent, or Firm*—Alston & Bird LLP (57) ABSTRACT

The present invention relates to the improvement of the aerodynamic properties of bluff-body shaped ground vehicles. A least one air modulator is assembled on the vehicle to modify an air flow around the vehicle, such that the drag on the vehicle is decreased. Each air modulator has an array of openings including a number of openings, which are arranged next to one another along an essentially straight line. A control unit controls the at least one air modulator output oscillating air from each opening such that air vortices are formed outside the opening. The at least one air modulator is arranged on the vehicle, such that these air vortices have axes that, in proximity to the opening, are essentially perpendicular to a forward driving direction of the vehicle.

19 Claims, 5 Drawing Sheets

U.S. PATENT DOCUMENTS

| | | | |
|---|---|---|---|
| 1,871,396 A * | 8/1932 | Stalker | 296/180.1 |
| 1,903,818 A * | 4/1933 | Jutting | 244/12.1 |
| 2,037,942 A * | 4/1936 | Stalker | 180/89.1 |
| 2,514,695 A * | 7/1950 | Dempsey | 296/208 |
| 2,569,983 A * | 10/1951 | Farve | 244/206 |
| 2,844,337 A * | 7/1958 | Macarthur et al. | 244/207 |
| 2,894,703 A * | 7/1959 | Hazen et al. | 244/204.1 |
| 2,973,922 A * | 3/1961 | Davidson et al. | 244/15 |
| 3,062,483 A * | 11/1962 | Davidson | 244/207 |
| 3,374,971 A * | 3/1968 | Heskestad | 244/130 |
| 3,410,510 A * | 11/1968 | Papst | 244/130 |
| 3,529,862 A * | 9/1970 | Jousserandot | 296/180.1 |
| 3,934,923 A * | 1/1976 | Lissaman et al. | 296/180.2 |
| 3,999,797 A * | 12/1976 | Kirsch et al. | 296/180.4 |
| 4,006,932 A * | 2/1977 | McDonald | 296/180.4 |
| 4,057,280 A * | 11/1977 | MacCready et al. | 296/180.4 |
| 4,113,299 A * | 9/1978 | Johnson et al. | 296/180.4 |
| 4,320,920 A * | 3/1982 | Goudey | 296/180.4 |
| 4,343,506 A * | 8/1982 | Saltzman | 296/24.31 |
| 4,437,698 A * | 3/1984 | Tantalo | 296/180.3 |
| 4,455,045 A | 6/1984 | Wheeler | |
| 4,671,474 A | 6/1987 | Haslund | |
| 4,693,201 A | 9/1987 | Williams et al. | |
| 5,374,013 A | 12/1994 | Bassett et al. | |
| 5,407,245 A | 4/1995 | Geropp | |
| 5,758,823 A * | 6/1998 | Glezer et al. | 239/4 |
| 5,813,625 A * | 9/1998 | Hassan et al. | 244/17.11 |
| 5,908,217 A | 6/1999 | Englar | |
| 5,957,413 A * | 9/1999 | Glezer et al. | 244/208 |
| 6,186,412 B1 * | 2/2001 | Bachar | 239/102.1 |
| 6,378,932 B1 | 4/2002 | Fasel et al. | |
| 6,464,167 B2 * | 10/2002 | Hayes | 244/15 |
| 6,644,598 B2 * | 11/2003 | Glezer et al. | 244/208 |
| 7,255,309 B2 * | 8/2007 | Boldrin et al. | 244/208 |
| 7,625,034 B1 * | 12/2009 | Fitzgerald | 296/180.1 |
| 2002/0021023 A1 * | 2/2002 | Leban | 296/180.1 |
| 2006/0022092 A1 * | 2/2006 | Miller et al. | 244/200.1 |
| 2006/0060723 A1 * | 3/2006 | Greenblatt | 244/207 |
| 2007/0235590 A1 * | 10/2007 | Kokoshkin et al. | 244/130 |
| 2008/0087771 A1 * | 4/2008 | Boespflug et al. | 244/207 |

FOREIGN PATENT DOCUMENTS

| | | |
|---|---|---|
| EP | 1 544 089 | 6/2005 |
| GB | 2 347 903 | 9/2000 |
| JP | 06016157 A * | 1/1994 |

OTHER PUBLICATIONS

International Search Report for International Application No. PCT/SE2006/000031 completed Mar. 10, 2006.

* cited by examiner

AERODYNAMIC PROPERTIES OF GROUND VEHICLES

THE BACKGROUND OF THE INVENTION AND PRIOR ART

The present invention relates generally to the improvement of the aerodynamic properties of vehicles, such as trucks, busses, trains, trailers, passenger cars, hovercrafts and motorcycles. More particularly, the invention relates to an airflow control system for ground vehicles, such as bluff-body shaped ground vehicles.

Various solutions are known for improving the aerodynamic properties of a so-called bluff body, i.e. a non-streamlined shape that produces considerable resistance when moving through the air, or a similar medium. Typically, a region of separated airflow occurs over a large portion of the surface of a bluff body. This results in a high drag force and a large wake region. The airflow often exhibits unsteadiness in the form of periodic vortex formation and shedding. Naturally, these effects are undesired. Therefore, to obtain low fuel consumption, bluff-body vehicle shapes should generally be avoided. However, for ground vehicles (trucks, busses and trailers in particular) various regulations place restrictions on the vehicles' maximum outer dimensions. Thus, in order to economize the available vehicle volume, heavy vehicles are normally designed with a shape which to a large extent is a bluff body, i.e. where the front and back surfaces are essentially flat, vertical walls. Instead, to reduce the known drawbacks of such a vehicle shape, airflow control systems may be used to improve the aerodynamics.

The document U.S. Pat. No. 5,908,217 describes a pneumatic aerodynamic control and drag-reduction system for ground vehicles. The system reduces flow separation at the rear portion of a moving vehicle by discharging air at this portion of the vehicle. Blowing outlets are arranged to discharge the air through one or more tangential slots which extend transversely of the upper and/or lower rear portion of the vehicle. Moreover, differential right/left blowing systems may be used to counteract lateral and directional instabilities, for instance when the vehicle is exposed to side winds.

The document U.S. Pat. No. 5,407,245 shows another solution for reducing the drag in the rear region of a vehicle. Blowers emit air through openings in the rear wall of the vehicle to increase the Bernoulli's total pressure behind the vehicle, and thus reduce the air resistance. Here, the blowers are also arranged to suck in air through openings in walls of the vehicle that are located in a so-called eddying zone.

The document U.S. Pat. No. 5,374,013 discloses a method for reducing the drag on a moving body, such as a truck. Here, the vehicle's rear air pressure is increased by forming a pressure shell having a large vortex behind the vehicle. Specifically, a plurality of dynamic flow controllers emit air via a respective high pressure nozzle, which may be rotatable to produce a vortex having a rotation axis parallel to the vehicle's driving direction. The air from the individual flow controllers is then combined into the large vortex.

Thus, various solutions are known for improving the aerodynamic properties of bluff-body shaped vehicles. However, the known strategies either fail to reduce the air drag behind large vehicles sufficiently, and/or these strategies imply an apparatus that is complex, expensive and/or unreliable.

SUMMARY OF THE INVENTION

One object of the present invention is therefore to provide a solution, which alleviates the above-mentioned problems, and thus enables an uncomplicated, cost-efficient and reliable drag reduction for ground vehicles.

Another object of the present invention is to improve the stability of a ground vehicle.

Yet another object of the present invention is to lessen any undesired lift forces exerted on a ground vehicle as a result of a high air resistance experienced by the vehicle.

According to one aspect of the invention, these objects are achieved by the initially described airflow control system, wherein the system includes an air modulator and a control unit. The air modulator has an array of openings including a number of openings, which are arranged next to one another along an essentially straight line. The control unit is adapted to control the air modulator to output oscillating air from each opening, such that air vortices are created outside the opening. These air vortices have spin axes that in proximity to the opening are essentially parallel to the essentially straight line.

An important advantage attained by this system is that the oscillating (or non-steady-state) airflow generated thereby perturbates the shear layers around the vehicle. This in turn, reduces the global vortices (or eddies) that arise behind the vehicle. Moreover, these vortices arise more remote from the vehicle. As a result, the vehicle's air resistance decreases and the fuel consumption can be lowered. Furthermore, any tailing passenger cars or motorcycles experience less stability problems when approaching from behind the vehicle.

According to one embodiment of this aspect of the invention, the array of openings includes a number of slots, which each has a width and a length dimension where the length dimension is several factors larger than the width dimension. For instance, the slot width dimension may lie in an interval from approximately 0.1 mm to approximately 10 mm, and the slot length dimension may lie in an interval from approximately 30 mm to approximately 300 mm. More preferably, the width dimension lies in the 0.3 mm-2.0 mm. The slots are arranged next to one another along an essentially straight line parallel to each slot's length dimension. This opening configuration accomplishes a very cost-efficient implementation of the air modulator.

According to another embodiment of this aspect of the invention, the array of openings instead includes a number of holes, which each has an opening dimension in an interval from approximately 0.1 mm to approximately 10 mm, and more preferably, within 0.3 mm-2.0 mm. Such an opening configuration is highly flexible in terms of accomplishing an unobtrusive integration of the air modulator into a vehicle.

According to a further embodiment of this aspect of the invention, the air modulator includes a tubular element on which the array of openings is arranged. The tubular element also includes a modulating member that extends along a substantial portion of an interior of the tubular element. The modulating member has a polygon shaped cross section, and is rotatable around its symmetry axis in response to a control signal from the control unit, so as to produce the oscillating output of air. i.e., the air oscillations are created as an amount of air located in an interspace between the modulating member and the tubular element is pushed out through the slot each time an edge of this element passes the slot). This design is desirable because it provides an efficient and reliable means for generating a synchronized oscillating airflow through a large total opening area.

According to another embodiment of this aspect of the invention, the air modulator includes at least one diaphragm, which is arranged in a cavity adjoining at least one of the openings in the array of openings. The diaphragm is adapted to vibrate in response to a control signal from the control unit, so as to produce the oscillating output of air. This design is desirable because it enables a slim air modulator profile, i.e. it is comparatively straightforward to integrate this unit in an existing vehicle body.

According to a further embodiment of this aspect of the invention, the air modulator includes at least one valve, which is arranged to emit an active airflow from a compressed air system in response to a control signal from the control unit. Thereby, the oscillating output of air is produced as the valves are repeatedly opened and closed.

According to yet another embodiment of this aspect of the invention, the control unit is adapted to control an air oscillating frequency of the air exiting from the array of openings in a range from approximately 5 Hz to approximately 500 Hz, or more preferably within 10-60 Hz. Namely, this renders it possible to adapt the air oscillating frequency to a most relevant range of vehicle speeds.

According to another aspect of the invention, these objects are achieved by the initially described ground vehicle, which includes least one of the proposed airflow control systems. The air modulator of each of the at least one system is here arranged on the vehicle with the array of openings having such an orientation relative to the outer surface that when the vehicle travels at a particular speed, an amount of vortex shedding behind the rear surface is lower than if the vehicle had traveled at this speed without the at least one airflow control system.

According to one embodiment of this aspect of the invention, one of the at least one airflow control system has its air modulator arranged essentially along an intersection line between the main upper surface and the rear surface. Namely, this positioning of the air modulator causes the oscillating air vortices to interact very efficiently with the lateral shear layers behind the vehicle.

According to another embodiment of this aspect of the invention, one of the at least one airflow control system has its air modulator arranged essentially along an intersection line between the general front surface and the main upper surface. This positioning is also advantageous with respect to air resistance, however, perhaps more as a complement rather than an alternative to the above-mentioned rear positioning.

According to still another embodiment of this aspect of the invention, a first airflow control system has its air modulator arranged essentially along a first intersection line between a first side surface and the rear surface. Correspondingly, a second airflow control system has its air modulator arranged essentially along a second intersection line between a second side surface and the rear surface. Such a positioning of the air modulators causes the oscillating air vortices to interact very efficiently with the vertical shear layers behind the vehicle, and thus reduce the drag.

According to yet another embodiment of this aspect of the invention, each of the at least one airflow control system has its air modulator arranged on the vehicle with the essentially straight line of the respective array of openings oriented essentially perpendicular to a forward driving direction of the vehicle. This orientation is efficient because thereby a longest array is exposed to the airflow around the vehicle.

According to another embodiment of this aspect of the invention, each of the at least one airflow control system has its air modulator arranged on the vehicle with the array of openings oriented, such that each opening emits air in a main direction having an angle of 90 to 175 degrees to the forward driving direction. Namely, angles in this range have been found to give rise to especially well-behaved airflow behind the vehicle.

According to still another embodiment of this aspect of the invention, the control unit is adapted to receive a velocity signal that represents a speed of the vehicle. The control unit is then adapted control the air modulator in response to the velocity signal, such that a relatively high vehicle speed results in a comparatively high output air oscillation frequency, and vice versa, a relatively low vehicle speed results in a comparatively low output air oscillation frequency. For very low velocities, the airflow control system may even be shut off. Namely, for optimal results, a velocity dependant oscillation frequency is desirable. However, at very low velocities, the air resistance becomes insignificant.

According to yet another embodiment of this aspect of the invention, the control unit is also adapted to receive a velocity signal that represents a speed of the vehicle. Here, however, the control unit controls the air modulator in response to the velocity signal, such that a peak-to-peak amplitude of a speed of the air exiting from each opening is equivalent to approximately 0.5 time to approximately 10 times the speed (or the so-called freestream velocity). Namely, also the amount of airflow energy to add for optimal results depends on the vehicle's speed. Naturally, the control unit may regulate both the output air oscillation frequency and the peak-to-peak amplitude of the air speed in response to the measured speed of the vehicle.

According to another embodiment of this aspect of the invention, the vehicle includes a compressed air system, which is connected to the air modulator of at least one of the at least one air flow control system. Thereby, an active airflow can be supplied to the array of openings, such that the energy added to the airflow around the vehicle is increased. Hence, the advantageous effects of the proposed air vortices are improved.

According to a further embodiment of this aspect of the invention, the vehicle includes at least one flow amplification surface, which is arranged on the vehicle downstream relative to the air flow of at least one of the at least one air modulator. The at least one flow amplification surface is adapted to augment the air vortices. Thereby, the efficiency of the airflow control system is improved.

In addition to the above-mentioned advantages, the invention is beneficial in that it reduces the amount of soiling of the vehicle's exterior surfaces that results from the global vortices behind the vehicle. Moreover, by applying the invention, the average wind noise level can be reduced.

Further advantages, advantageous features and applications of the present invention will be apparent from the following description and the dependent claims.

BRIEF DESCRIPTION OF THE DRAWINGS

The present invention is now to be explained more closely by means of embodiments, which are disclosed as examples, and with reference to the attached drawings.

DESCRIPTION OF EMBODIMENTS OF THE INVENTION

Figure 1:
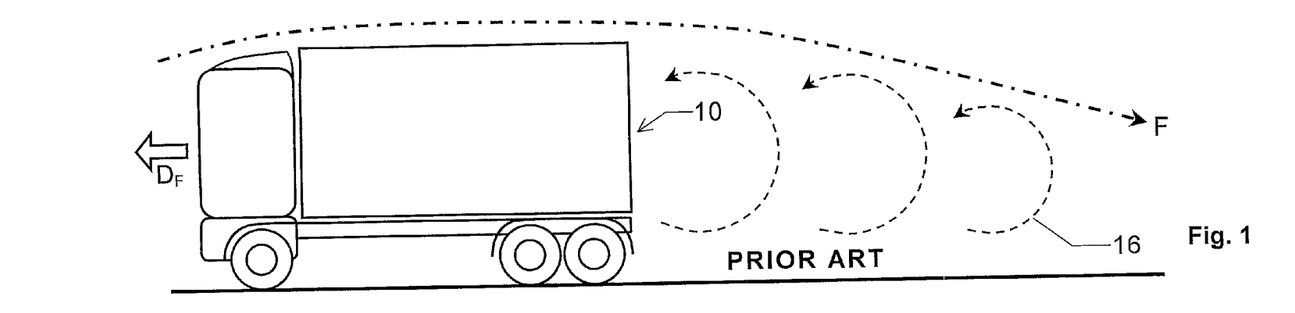
FIG. 1 illustrates how vortex shedding arises behind a prior art ground vehicle without any airflow control mechanisms.

FIG. 1 shows a ground vehicle 10 that travels in a forward direction $D_F$. The vehicle 10 is not equipped with any airflow control mechanisms. Therefore, due to the vehicle's 10 pronounced bluff-body shape, a relatively large amount of vortex shedding 16 arises behind the vehicle 10.

Figure 2A:
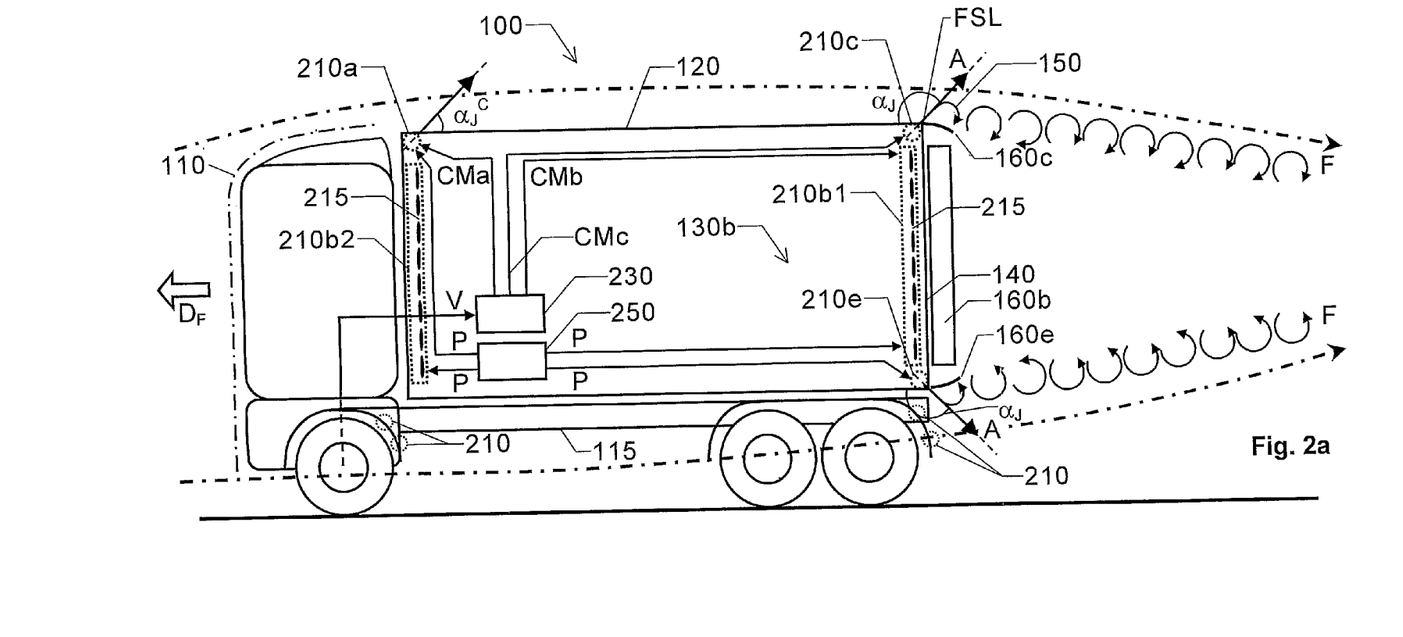
FIGS. 2a-b show different views of a first type of ground vehicle, through which the operation principles of the invention are schematically illustrated.

FIG. 2a shows a side-view of a first type of ground vehicle 100 in the form of a truck. The vehicle 100 has a body with an outer surface including a general front surface 110, a bottom surface 115, a main upper surface 120, two side surfaces 130b (of which one appears in this view), and a rear surface 140. As can be seen in the FIG. 2a, the general front surface 110 extends also over an almost horizontal surface of the vehicle's cabin. Namely, in this specification, a transition from the general front surface 110 to the main upper surface 120 is defined to be at the front-most part of a horizontal vehicle top surface of substantial length. Thus, for trucks, the main upper surface 120 is normally delimited by the front and back edges of the vehicle's cargo space. However, as will be seen in FIG. 4, for other types of vehicles, other delimitations may be applicable.

The vehicle 100 is equipped with at least one airflow control system to modify an air flow F around the vehicle 100, such that when the vehicle 100 travels at a particular speed (and wind conditions) the drag on the vehicle 100 is lower than if the vehicle 100 had traveled at this speed (and wind conditions) without the system. The proposed system creates small-scale air vortices 150 adjacent to shear layers of the airflow F around the vehicle 100. This, in turn, weakens the strength of any of global vortex shedding behind the vehicle 100.

According to the invention, the airflow control system includes an air modulator and a control unit. Here, the airflow control system includes a plurality of air modulators 210a, 210b1, 210b2, 210c, 210d1, 210d2 (see FIG. 2b) and 210e respectively and a common control unit 230. Of course, instead of the illustrated common control unit 230, a separate control unit for each air modulator is also conceivable.

Each air modulator 210a, 210b1, 210b2, 210c, 210d1, 210d2 and 210e has an array of openings 215 that includes a number of slots or holes, i.e. one or more slots/holes. The dimensions and aspect ratios of these openings will be discussed in detail below with reference to FIGS. 5a to 8c. Nevertheless, the openings are arranged next to one another along an essentially straight line.

The control unit 230 is adapted to control each air modulator 210a, 210b1, 210b2, 210c, 210d1, 210d2 and 210e to output oscillating air from each opening in such a manner that air vortices 150 are created outside the openings. The air vortices 150, which have spin axes that in proximity to the openings are essentially parallel to the essentially straight line, are accomplished by repeatedly (either periodically or irregularly) pushing amounts of air from inside the air modulator out through the openings. Different embodiments of air modulators according to the invention will be described below with reference to FIGS. 5a, 5b, 6a, 6b, 7a and 7b.

Preferably, each air modulator 210a, 210b1, 210b2, 210c, 210d1, 210d2 and 210e is further arranged on the vehicle 100 with the essentially straight line of the respective array of openings 215 oriented essentially perpendicular to a forward driving direction $D_F$ of the vehicle 100. It is further preferable if the air modulators 210a, 210b1, 210b2, 210c, 210d1, 210d2 and 210e are arranged on the vehicle 100, such that the openings of the respective air modulator are located downstream of a flow separation line FSL at which flow separation would occur if no synthetic air vortices 150 had been generated. Thus, in case of a vehicle 100 with sharp edges between the rear surface 140 and the side surfaces 130b, 130d and/or between the rear surface 140 and the bottom surface 115 and/or between the rear surface 140 and the top surface 120; the air modulator openings are preferably positioned at the far back of the vehicle 100.

According to the invention, by essentially perpendicular to the direction $D_F$ is meant a maximum deviation of 10 degrees from 90 degrees (i.e. from 80 degrees to 100 degrees). Consequently, the spin axes of the air vortices 150 are also (at least in proximity to the openings) essentially perpendicular to the direction $D_F$. This is a key factor in the above-mentioned perturbation of the shear layers around the vehicle 100, which reduces the global vortices behind the vehicle 100.

Moreover, it is advantageous if one or more flow amplification surfaces 120, 160b, 160c, 160d and 160e are provided further downstream of the each air modulator 210a, 210b1, 210b2, 210c, 210d1, 210d2 and 210e respectively relative to the air flow F, which are adapted to augment the air vortices 150. For example, at the rear surface 140, protruding plates 160b, 160c, 160d and 160e may constitute the amplification surfaces. Such protruding plates preferable have a profile that is slightly curved towards the rear surface 140. It is further advantageous if the plates are foldable, so that they do not protrude from the vehicle 100 when the airflow control system is inactive. Specific aspects of the protruding plates 160b, 160c, 160d and 160e according to preferred embodiments of the invention will be discussed below with reference to FIG. 3.

In the example shown in the FIG. 2a, a first air modulator 210a is arranged essentially along an intersection line between the general front surface 110 and the main upper surface 120 (i.e. here at the front edge of the vehicle's 100 cargo space). Of course, the top surface 120 may serve as a flow amplification surface in respect of this air modulator 210a. Correspondingly the side surface 130b may serve as a flow amplification surface in respect of an air modulator 210b2 arranged vertically at the front edge of the vehicle's 100 cargo space.

The control unit 230 controls the operation of the modulator 210a by means of a first control signal CMa. Moreover, a second air modulator 210c is arranged essentially along an intersection line between the main upper surface 120 and the rear surface 140 (i.e., here at the back edge of the vehicle's 100 cargo space). The control unit 230 controls the operation of this modulator 210c by means of a second control signal CMc. Additionally, by means of a third control signal CMb, the control unit 230 controls the operation of a third and a fourth air modulator 210b1 and 210d1 (see FIG. 2b), which are arranged essentially along a first intersection line between a first side surface 130b and the rear surface 140, respective essentially along a second intersection line between a second side surface 130d (see FIG. 2b) and the rear surface 140.

According to one embodiment of the invention, each air modulator 210a, 210b1, 210b2, 210c, 210d1, 210d2 and 210e is arranged on the vehicle 100 with the array of openings 215 oriented, such that the openings thereof emit air in a main direction A at an angle $\alpha_J$ to the forward driving direction $D_F$. Most preferably $\alpha_J \approx 155$ degrees. In other words, a complementary angle $\alpha_J^C$ between a main direction A of for example the first air modulator 210a and the (essentially horizontal)

main upper surface 120 is most preferably around 25 degrees. However, according to the invention, the angle $\alpha_J$ may lie anywhere in an interval from 90 degrees to 175 degrees (i.e. with a complementary angle $\alpha_J^c$ ranging from 5 degrees to 90 degrees).

Such a main direction A results in that the oscillating air vortices 150 interact very efficiently with the lateral shear layers of the air flow F behind the vehicle 100. For reasons of a clear presentation, this is here illustrated in a highly simplified manner by means arrows 150 that represent the air vortices generated by the air modulators 210a and 210c adjoining the dashed arrow symbolizing the air flow F.

In addition, or as alternatives, to the above-mentioned air modulators 210a, 210b1, 210b2, 210c, 210d1, 210d2 and 210e, air modulators may be positioned for example at the rear surfaces of the vehicle's 100 fender wings. These locations are schematically shown in the FIG. 2a by means of dashed circles 210. In fact, an air modulator can be arranged along each bodyline of the vehicle 100 where flow separation occurs. Hence, if the vehicle 100 has a protruding engine hood, air modulators may also be positioned proximate to any edges of this hood.

Figures 2B, 3:
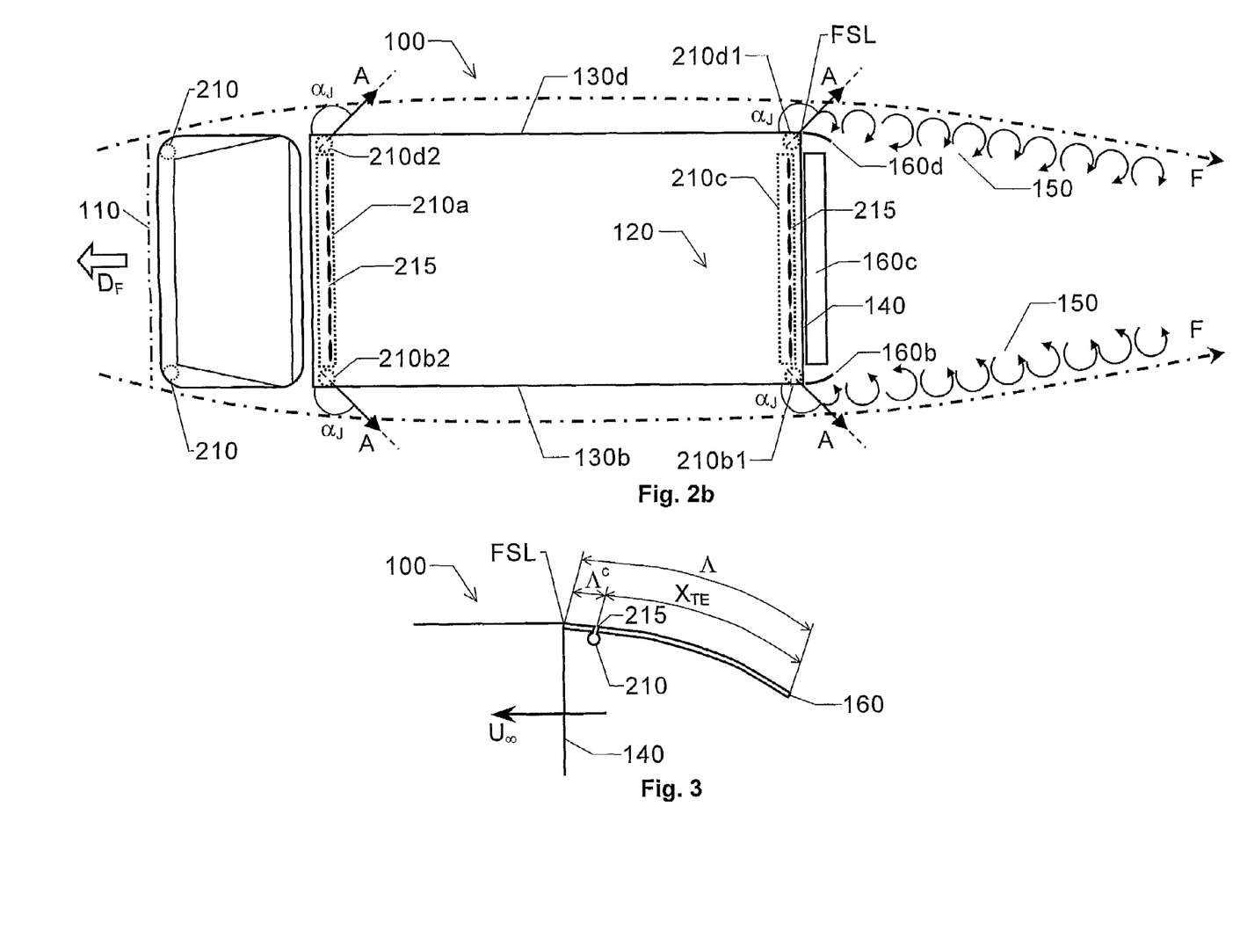
FIG. 3 shows an amplification surface in the form of a protruding plate according to one embodiment of the invention.

Turning now to FIG. 2b, which shows a top-view of the vehicle 100 in the FIG. 2a, we see that also the air modulators 210b1, 210b2, 210d1 and 210d2 are oriented with their arrays of openings 215, such that the openings thereof emit air in a main direction A at the angle $\alpha_J$ to the forward driving direction $D_F$. Correspondingly, this main direction A results in that the oscillating air vortices 150 from the air modulators 210b1, 210b2, 210d1 and 210d2 interact very efficiently with the vertical shear layers of the air flow F behind the vehicle 100.

Returning to the FIG. 2a, according to one embodiment of the invention, the control unit 230 receives a velocity signal V, which represents a speed of the vehicle 100. The control unit 230, in turn, controls one or more of the air modulators 210a, 210b1, 210b2, 210c, 210d1, 210d2, 210e and 210 in response to the velocity signal V, such that a relatively high vehicle speed results in a comparatively high output air oscillation frequency, and vice versa, a relatively low vehicle speed results in a comparatively low output air oscillation frequency.

Moreover, the control unit 230 may control at least one air modulator 210a, 210b1, 210b2, 210c, 210d1, 210d2, 210e and/or 210 in response to the velocity signal V, such that a peak-to-peak amplitude of an air speed exiting from each opening depends on the vehicle speed. Preferably, the peak-to-peak amplitude is equivalent to approximately 0.5 time to approximately 10 times the vehicle speed, and more preferably, the peak-to-peak amplitude is equivalent to approximately 1 time to approximately 3 times the vehicle speed. The vehicle speed here represents the so-called freestream velocity, i.e. the speed at which the airflow F passes the vehicle 100.

According to one embodiment of the invention, a compressed air system 250 (which is normally included in the vehicle 100 for other purposes) is connected to at least one of the air modulators. In the example illustrated in the FIG. 2a, the compressed air system 250 is connected to the first air modulator 210a and the second air modulator 210c. Thus, an active airflow P is supplied to the arrays of openings 215 of these modulators 210a and 210c respectively. Thereby, the amount of energy added to the airflow F via these modulators can be increased to improve their influence on the reduction of the vortex shedding.

FIG. 3 shows an amplification surface in the form of a protruding plate 160 according to one embodiment of the invention. We here presume that the plate 160 is mounted at a rear surface 140 of a vehicle 100, such as the truck in the FIGS. 2a and 2b. The plate 160 protrudes from the rear surface 140 a distance represented by an overall length $\Lambda$. Moreover, an air modulator 210 is arranged relative to the plate 160, such that an array of openings 215 of the modulator 210 is positioned a distance $\Lambda^c$ from a flow separation line FSL adjacent to the surface 140. Thus, a remaining surface over which oscillating air vortices from the air modulator 210 may be amplified extends a distance $X_{TE}=\Lambda-\Lambda^c$ from the array of openings 215. Preferably $\Lambda^c$ lies in an interval from 0 to $0.60\Lambda$, however, more preferably $0.05\Lambda<\Lambda^c<0.30\Lambda$.

In the FIG. 3, an arrow indicates a freestream velocity $U_\infty$ representing the speed at which the vehicle 100 travels. According to this embodiment of the invention, a non-dimensional normalized frequency $F^+$ is defined as:

$$F^+ = \frac{f \cdot X_{TE}}{U_\infty}$$

where f represents the frequency at which the air modulator 210 produces oscillating air vortices. It is desirable that the non-dimensional normalized frequency $F^+$ is larger than 0.05 and less than 30. More preferably $0.1<F^+<1.0$, and optimally $F^+$ lies in an interval from 0.1 to 0.6.

Figure 4:
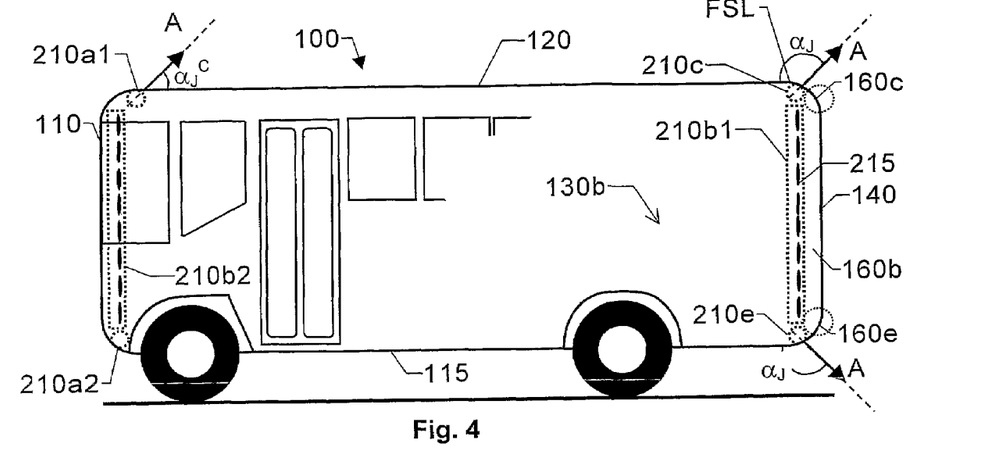
FIG. 4 illustrates how the invention may be applied to a second type of ground vehicle.

FIG. 4 shows a second type of ground vehicle 100 in the form of a bus. Also this vehicle 100 has a body with an outer surface that includes a general front surface 110, a main upper surface 120, two side surfaces 130b (of which one appears in this view), and a rear surface 140. Here, however, the general front surface 110 transitions into the main upper surface 120 relatively sharply, since in this case the horizontal vehicle top surface of substantial length begins almost immediately at front of the vehicle 100.

In similarity with the vehicle shown in the FIGS. 2a and 2b, the vehicle 100 in the FIG. 4 is equipped with at least one airflow control system to modify an air flow F around the vehicle 100, such that when the vehicle 100 travels at a particular speed (and wind conditions) the drag on the vehicle 100 is lower than if the vehicle 100 had traveled at this speed (and wind conditions) without the system.

In this example, eight air modulators 210a1, 210a2, 210b1, 210b2, 210c and 210e (plus two vertical modulators at the front and the rear on the vehicle's right-hand side, which are not visible in this view) are included in the airflow control system. Each air modulator has an array of openings 215 that includes a number of openings, which are arranged next to one another along an essentially straight line. A control unit (not shown) controls each air modulator 210a1, 210a2, 210b1, 210b2, 210c and 210e to output oscillating air from each opening in such a manner that air vortices are created outside the openings. The air vortices, which have spin axes that in proximity to the openings are essentially parallel to the essentially straight line, are accomplished by repeatedly (either periodically or irregularly, continuously varying or burst wise) pushing amounts of air from inside the air modulator out through the openings. Preferably, the air modulators 210a1, 201a2, 210b1, 210b2, 210c and 210e are arranged on the vehicle 100 with the essentially straight line of the respective array of openings 215 oriented essentially perpendicular to a forward driving direction of the vehicle 100, so that the spin axes of the air vortices 150 are also (at least in proximity to the openings) essentially perpendicular to this direction.

According to one embodiment of the invention, each air modulator 210a1, 210a2, 210b1, 210b2, 210c and 210e is arranged on the vehicle 100 with the array of openings 215 oriented, such that the openings thereof emit air in a main direction A at an angle $\alpha_J$ to the forward driving direction $D_F$, where $\alpha_J$ preferably is around 155 degrees and a complementary angle $\alpha_J^C$ between a main direction A of for example the first air modulator 210a and the main upper surface 120 is preferably around 25 degrees. However, as mentioned above, the angle $\alpha_J$ may lie anywhere in an interval from 90 degrees to 175 degrees (i.e. with a complementary angle $\alpha_J^C$ ranging from 5 degrees to 90 degrees).

In similarity with the vehicle shown in the FIGS. 2a and 2b, it is advantageous if the air modulators 210a1, 210a2, 210b1, 210b2, 210c and 210e are arranged on the vehicle 100, such that the openings of the respective air modulator are located downstream of a flow separation line FSL at which flow separation would occur if no synthetic air vortices 150 had been generated. Here, the vehicle 100 has relatively rounded edges between the rear surface 140 and the side surfaces 130b, between the rear surface 140 and the bottom surface 115 and between the rear surface 140 and the top surface 120. Therefore, adequate flow amplification surfaces 120, 130b, 160b, 160c and 160e can be provided by portions of the vehicle's 100 body, namely said rounded edges. Naturally, an existing body shape may have to be modified to some extent in order to represent an optimal flow amplification surface. Nevertheless, these surfaces may be designed very discretely. Furthermore, the design may be complemented by one or more protruding plates, which can foldable, so that they do not protrude from the vehicle 100 when the airflow control system is inactive.

Figures 5A, 6A:
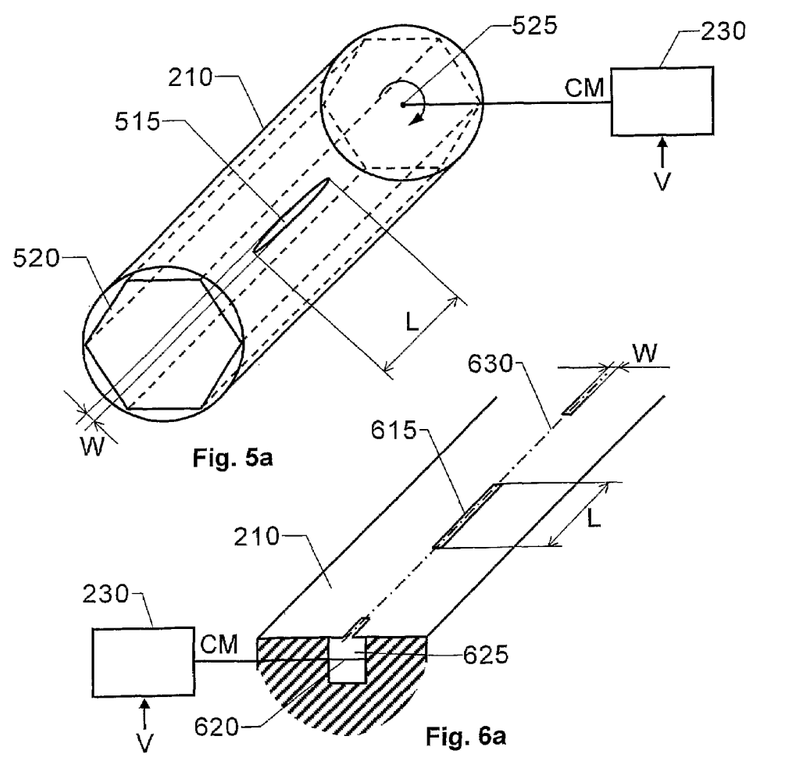
FIGS. 5a-b show variations of a proposed air modulator according to a first embodiment of the invention.
FIGS. 6a-b show variations of proposed air modulator according to a second embodiment of the invention.

FIG. 5a shows section of a proposed air modulator 210 according to a first embodiment of the invention. The air modulator 210 has a tubular element on which an array of openings is arranged. In the illustrated section of the air modulator 210 one exemplifying opening in the form of a slot 515 is included. This slot 515 has a width dimension W and a length L dimension, where the length dimension L is several factors larger than the width dimension W. Preferably, the width dimension W lies in a range from approximately 0.1 mm to approximately 10 mm (more preferably, 0.3 mm<W<2.0 mm), and the length dimension L lies in a range from approximately 30 mm to approximately 300 mm.

The tubular element includes a modulating member 520 that extends along a substantial portion of an interior of the tubular element. The modulating member 520 has a polygon shaped cross section, such a hexagon or a pentagon. However, any other regular or irregular cross section shape is conceivable according to the invention. Nevertheless, the modulating member 520 is rotatable around its symmetry axis 525 (or, if the cross section shape is irregular, center-of-gravity axis). Therefore, the cross section shape must allow the modulating member 520 to rotate freely within the tubular element of the air modulator 210.

A transmission line connects the modulating member 520 to a control unit 230 (see also FIG. 2a), such that this unit, by means of a control signal CM, may control the member 520 to produce a desired oscillating output of air. Specifically, these air oscillations are created when an amount of air located in a interspace between the modulating member 520 and the tubular element is pushed out through the slot 515 each time an edge of the element 520 passes the slot 515. Thus, a constant rotation speed and a regular cross section shape of the modulating member 520 causes equally large amounts of air to be emitted each time. However, a variation of the rotation speed results in a corresponding variation of the air oscillation frequency, and an irregular cross section shape of the modulating member 520 produces an air pulsation pattern which has a lower repetition rate than what is given by the distance between two consecutive edges of the modulating member 520. As will be described below with reference to FIGS. 6b, 7a and 8b, the openings in the air modulator's 210 array of openings may also have non-slot shaped profiles, such as circular, oval, polygon etc.

According to one embodiment of the invention, the control unit 230 is adapted to control the air oscillating frequency of the air exiting from each slot 515 in a range from approximately 5 Hz to approximately 500 Hz. The most desirable range is 10-60 Hz. It is further preferable if the oscillating frequency depends on a current vehicle speed. Therefore, as mentioned above, the control unit 230 may receive a velocity signal V representing a speed of the vehicle, in response thereto, control the modulating member 520, such that a relatively high vehicle speed results in a comparatively high output air oscillation frequency, and vice versa, a relatively low vehicle speed results in a comparatively low output air oscillation frequency.

FIG. 6a shows a section of a proposed air modulator 210 according to a second embodiment of the invention. Here, the air modulator 210 includes at least one diaphragm 620, which is arranged in a cavity 625 adjoining at least one opening in the above-mentioned array of openings. Preferably, corresponding cavities and diaphragms are arranged behind each opening (here in the form of slots 615) in the air modulator's 210 array of openings.

Nevertheless, in case the openings are slots, each slot 615 has a width dimension W and a length L dimension, where the length dimension L is several factors larger than the width dimension W. Preferably, the width dimension W lies in a range from approximately 0.1 mm to approximately 10 mm (more preferably 0.3-2.0 mm), and the length dimension L lies in a range from approximately 30 mm to approximately 300 mm. Moreover, as can be seen in the FIG. 6a, all the slots 615 in the array of openings are positioned next to one another along an essentially straight line 630, which is parallel to each slot's 615 length dimension L.

The air modulator 210 is connected to a control unit 230, and the diaphragm 620 is adapted to vibrate in response to a control signal CM from the control unit 230, so as to produce the oscillating output of air. In similarity with the embodiment of the invention described above with reference to the FIG. 5a, the control signal CM may in turn be correlated with a velocity signal V representing a speed of the vehicle onto which the air modulator 210 is mounted.

Figure 5B:
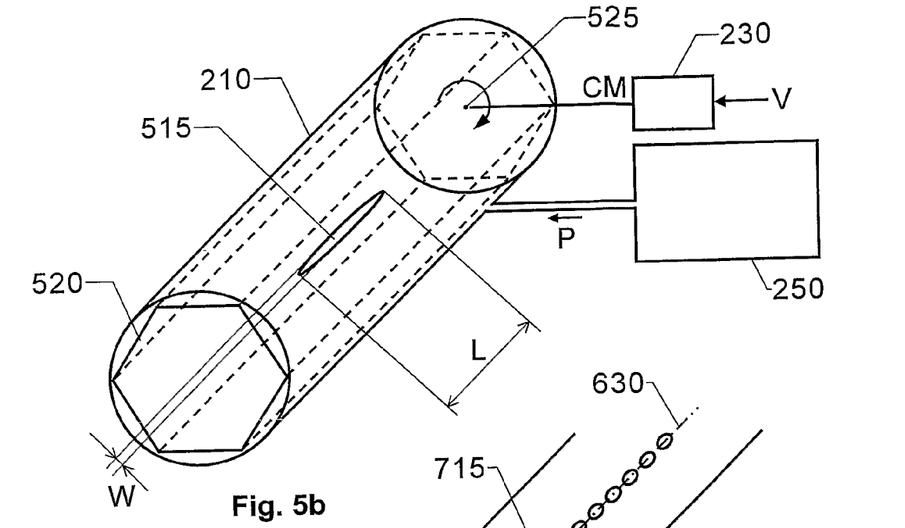

FIG. 5b shows a section of the air modulator 210 according to the above-described first embodiment of the invention, however where the tubular element is connected to a compressed air system 250 via an air conduit. Thus, via this conduit, an active airflow P is supplied to the tubular element. Such an active air-flow P enables a net amount of air to be added to the airflow that surrounds a vehicle, and thus accomplished an enhancement of the performance of the proposed airflow control system.

According to one embodiment of the invention, the control unit 230 receives a velocity signal V, which represents a speed of the vehicle onto which the air modulator 210 is mounted. The control unit 230 then controls the air modulator 210 in response to the velocity signal V, such that a peak-to-peak amplitude of a speed of the air exiting from each opening 515 is equivalent to approximately 0.5 time to approximately 10 times the speed.

Figure 6B:
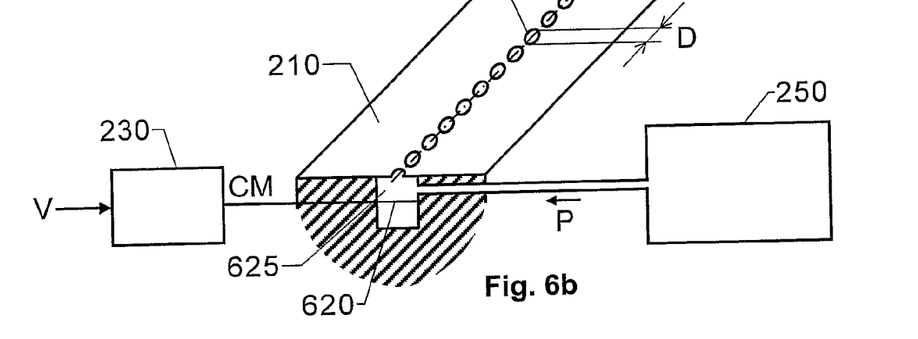

FIG. 6b shows the air modulator 210 according to the above-described second embodiment of the invention, however where the openings 715 in the array of openings are holes, i.e. apertures with an approximately equal opening dimension D in all directions. Hence, the openings 715 may have a circular, oval or polygon shape. Preferably, the opening dimension D lies in a range from approximately 0.1 mm to approximately 10 mm, or more preferably 0.3 mm-2.0 mm. Moreover; an air conduit connects the cavity 625 to a compressed air system 250. Thus, analogous to the embodiment described above with reference to the FIG. 5b, an active airflow P is accomplished.

Figure 7A:
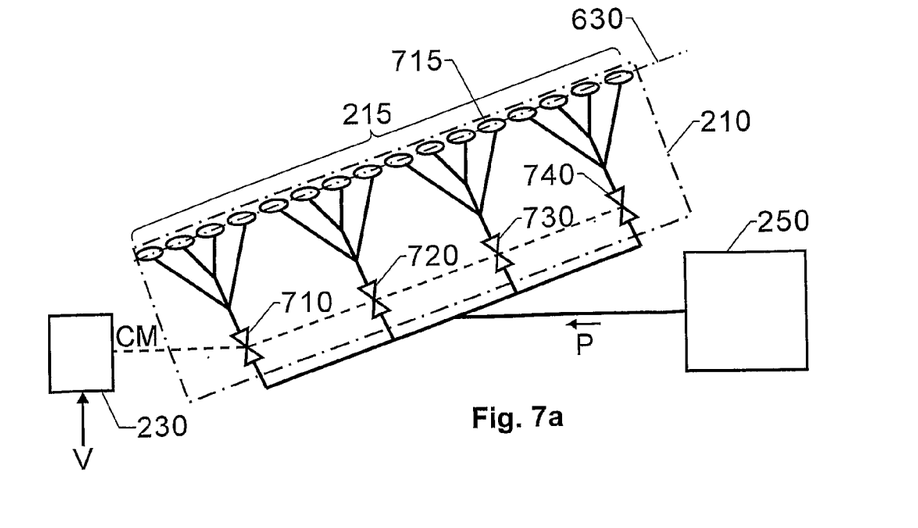
FIGS. 7a-b show variations of proposed air modulator according to a third embodiment of the invention, and FIGS. 8a-c exemplify different configurations of the arrays of openings according to embodiments of the invention.

FIG. 7a shows a section of the air modulator 210 according to a third embodiment of the invention, wherein an array of openings 215 contains a number of openings 715 arranged next to one another along an essentially straight line 630. Here, the air modulator 210 is represented by a set of valves 710, 720, 730 and 740 respectively. Namely, each opening 715 is connected to an air conduit, which is further connected to one of the valves 710, 720, 730 and 740. Each of these valves, in turn, 710, 720, 730 and 740 is connected to a compressed air system 250 via one or more further air conduits, so that an active airflow P can be received. Each valve 710, 720, 730 and 740 is controllable by a control unit 230 in response to a control signal CM. Thereby, the openings 715 may be controlled to emit synthetic air vortices according to what has been described above.

Figure 7B:
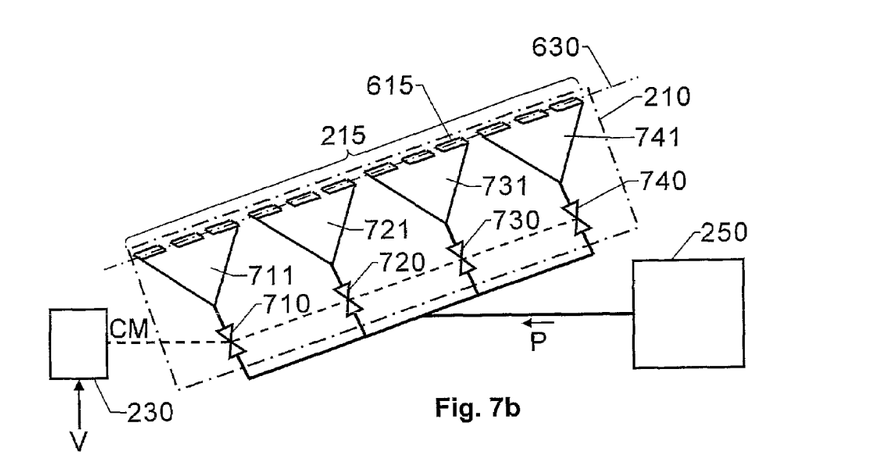

FIG. 7b shows a section of the air modulator 210 according to the third embodiment of the invention, however, where a sub-set of openings 615 are connected to a common air chamber 711, 721, 731 and 741 respectively. A respective valve 710, 720, 730 and 740 controls an active airflow P to each air chamber 711, 721, 731 and 741. The valves 710, 720, 730 and 740 are, in turn, controlled in response to a control signal CM from a control unit 230. The active airflow P is fed to the valves 710, 720, 730 and 740 from a compressed air system 250 via one or more air conduits. Hence, the control unit 230 may control the openings 615 to emit synthetic air vortices according to what has been described above.

Naturally, instead of having valves that are common for more than one opening as shown in the FIGS. 7a and 7b, a separate valve may equally well be employed to control the airflow from each opening.

According to another preferred embodiment of the invention, an active air flow P may be supplied to the openings of the air modulator 210 alternately either from a first air system providing air at a pressure such that air flows out of the air modulator openings, or from a second air system providing air at a pressure such that air is sucked in through the air modulator openings. Thereby, the active air flow P may be controlled so that its average pressure level attains a desired value.

Figures 8A, 8B:
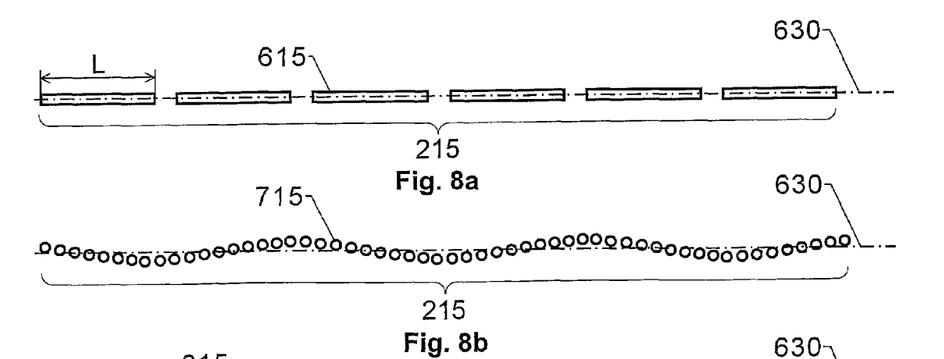
Figure 8C:
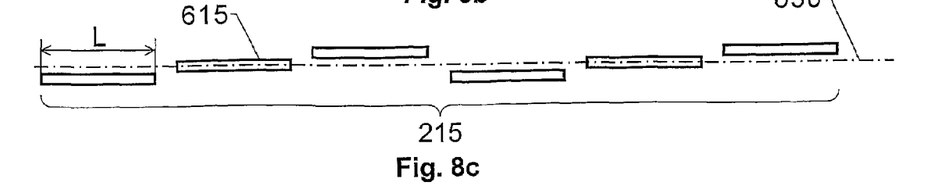

Finally, we now refer to FIGS. 8a, 8b and 8c in order to underline the fact that, according to the invention, a large number of different configurations of the slot array 215 are conceivable.

FIG. 8a illustrates an array of openings 215 where a number of slot shaped openings 615, e.g. six, are arranged next to one another along an at least essentially straight line 630, which is parallel to each slot's 615 length dimension L. Here, the length sides of the slots 615 form the essentially straight line 630.

FIG. 8b illustrates another array of openings 215 where a number of openings in the form of holes 715 are arranged next to one another along an at least essentially straight line 630. In this case, however, only a few of the holes 715 actually lie on this line 630. The remaining holes 715 are slightly displaced with respect to the essentially straight line 630.

FIG. 8c illustrates yet another slot array 215 where a number of openings in the form of slots 615 are arranged next to one another along an at least essentially straight line 630, which is parallel to each slot's 615 length dimension L. Here, some of the slots 615 are slightly displaced with respect to the essentially straight line 630, whereas the length sides of other slots 615 are aligned with this line 630.

Naturally, many different opening configurations in addition to the above-described configurations may also be applied according to the invention, for instance configurations where at least one extended opening (e.g. slot shaped) is slightly angled in relation to the essentially straight line 630.

Irrespective of how the openings are arranged relative to one another, it is preferable if the openings are physically protected when they are not in use, i.e. when the vehicle is stationary, or travels below a threshold speed. In order to accomplish this, protective shields may be provided, which are controllable in response to a velocity signal that represents the speed of the vehicle, so that the shields either cover or expose the openings to the exterior depending on a current vehicle speed.

The term "comprises/comprising" when used in this specification is taken to specify the presence of stated features, integers, steps or components. However, the term does not preclude the presence or addition of one or more additional features, integers, steps or components or groups thereof.

The invention is not restricted to the described embodiments in the figures, but may be varied freely within the scope of the claims.

The invention claimed is:

1. A ground vehicle having a body with an outer surface comprising a general front surface, a main upper surface, a bottom surface, two side surfaces and a rear surface, the vehicle having at least one airflow control system comprising:

at least one air modulator having an array of openings including a number of openings which are arranged next to one another along an essentially straight line, the air modulator of each of the at least one system is arranged on the vehicle with the array of openings having an orientation relative to the outer surface such that when the vehicle travels at a particular speed an amount of vortex shedding behind the rear surface is lower than if the vehicle had traveled at this speed without the at least one system; and a control unit adapted to control the air modulator to output oscillating air from each opening such that air vortices are created outside the opening where the air vortices have spin axes that are essentially parallel to the essentially straight line, wherein the vehicle comprises at least one flow amplification surface which is arranged on the vehicle downstream of the at least one air modulator relative to the air flow, and the at least one flow amplification surface is adapted to augment the air vortices, the flow amplification surface extending rewardly a distance, $\Lambda$, relative to the rear surface and the air modulator is arranged relative to the flow amplification surface such that the array of openings of the air modulator is positioned a distance, $\Lambda^c$, downstream of a flow separation line adjacent to the rear surface where flow separation would have occurred if no air vortices had been generated, resulting in that a surface over which air vortices from the air modulator may be amplified extends a distance, $X_{TE}$, from the array of openings, where $X_{TE}=\Lambda-\Lambda^c$.

2. The ground vehicle according to claim 1, wherein the array of openings includes a number of slots, each slot having a width and a length dimension where the length dimension is several factors larger than the width dimension, the slots are arranged next to one another along an essentially straight line parallel to each slot's length dimension.

3. The ground vehicle according to claim 2, wherein the slot width dimension lies in an interval from approximately 0.1 mm to approximately 10 mm.

4. The ground vehicle according to claim 2, wherein the slot length dimension lies in an interval from approximately 30 mm to approximately 300 mm.

5. The ground vehicle according to claim 1, wherein the array of openings includes a number of holes, each hole having an opening dimension in an interval from approximately 0.1 mm to approximately 10 mm.

6. The ground vehicle according to claim 1, wherein the at least one air modulator comprises a tubular element on which the array of openings is arranged, the tubular element including a modulating member extending along a substantial portion of an interior of the tubular element, the modulating member has a polygon shaped cross section, and the modulating member is rotatable around a symmetry axis thereof in response to a control signal from the control unit so as to produce the oscillating output of air.

7. The ground vehicle according to claim 1, wherein the at least one air modulator comprises at least one diaphragm arranged in a cavity adjoining at least one of the openings in the array of openings, each of the least one diaphragm is adapted to vibrate in response to a control signal from the control unit so as to produce the oscillating output of air.

8. The ground vehicle according to claim 1, wherein the at least one air modulator comprises at least one valve arranged to emit an active airflow from a compressed air system in response to a control signal from the control unit so as to produce the oscillating output of air.

9. The ground vehicle according to claim 1, wherein the control unit is adapted to control an air oscillating frequency of the air exiting from the array of openings in a range from approximately 5 Hz to approximately 500 Hz.

10. The ground vehicle according to claim 1, wherein the at least one air modulator is arranged essentially along an intersection line between the main upper surface and the rear surface.

11. The ground vehicle according to claim 1, further comprising a second air modulator, wherein the second air modulator is arranged essentially along an intersection line between the general front surface and the main upper surface.

12. The ground vehicle according to claim 1, wherein the vehicle comprises at least two airflow control systems of which a first system has a first air modulator arranged essentially along a first intersection line between a first side of the side surfaces and the rear surface, and a second system has a second air modulator arranged essentially along a second intersection line between a second side of the side surfaces and the rear surface.

13. The ground vehicle according to claim 1, wherein the at least one air modulator is arranged on the vehicle with the essentially straight line of the respective array of openings oriented essentially perpendicular to a forward driving direction of the vehicle.

14. The ground vehicle according to claim 13, wherein the at least one air modulator is arranged on the vehicle with the array of openings oriented such that each opening emits air in a main direction having an angle to the forward driving direction in an interval from approximately 90 degrees to approximately 175 degrees.

15. The ground vehicle according to claim 1, wherein the control unit is adapted to:
receive a velocity signal representing a speed of the vehicle; and
control the air modulator in response to the velocity signal, such that a relatively high vehicle speed results in a comparatively high output air oscillation frequency and a relatively low vehicle speed results in a comparatively low output air oscillation frequency.

16. The ground vehicle according to claim 1, wherein the control unit is adapted to:
receive a velocity signal representing a speed of the vehicle; and
control the air modulator in response to the velocity signal, such that a peak-to-peak amplitude of a speed of the air exiting from each opening is equivalent to approximately 0.5 times to approximately 10 times the speed.

17. The ground vehicle according to claim 1, wherein the vehicle comprises a compressed air system which is connected to the air modulator of at least one of the at least one air flow control system for supply of an active air flow to the array of openings.

18. The ground vehicle according to claim 1, wherein the distance $\Lambda^e$ lies in an interval from about $0.01\Lambda$ to $0.60\Lambda$.

19. The ground vehicle according to claim 1, wherein the distance $\Lambda^e$ lies in an interval from about $0.05\Lambda$ to $0.30\Lambda$.

* * * * *

UNITED STATES PATENT AND TRADEMARK OFFICE
CERTIFICATE OF CORRECTION

| | | |
|---|---|---|
| PATENT NO. | : 7,794,011 B2 | Page 1 of 1 |
| APPLICATION NO. | : 11/813188 | |
| DATED | : September 14, 2010 | |
| INVENTOR(S) | : Kjellgren et al. | |

It is certified that error appears in the above-identified patent and that said Letters Patent is hereby corrected as shown below:

<u>Column 12,</u>

Line 52, "rewardly" should read --rearwardly--.

Signed and Sealed this
Twelfth Day of July, 2011

David J. Kappos
*Director of the United States Patent and Trademark Office*